Nov. 15, 1966   W. WEDEL   3,284,943
FISH SNAGGING FISH HOLDER
Filed Oct. 1, 1964

INVENTOR
WILLIAM WEDEL

BY
ATTORNEY

United States Patent Office 3,284,943
Patented Nov. 15, 1966

3,284,943
FISH SNAGGING FISH HOLDER
William Wedel, 405 S. 18th St., Fort Pierce, Fla.
Filed Oct. 1, 1964, Ser. No. 400,773
3 Claims. (Cl. 43—15)

The present invention relates to fishing equipment generally and in particular to a holder for a fishing pole having means for automatically snagging and pulling in a fish when the bait is taken.

Previously proposed and manufactured have been fishing pole holders designed to retrieve a fish when it takes the bait. Such holders have not been accepted by the sporting world and generally the reasons for non-acceptance are that the devices proposed or manufactured are too cumbersome for use, have too intricate mechanisms, are expensive to construct, and frequently fail to operate in the manner intended.

The primary object of the present invention is to provide a fishing pole holder which automatically snags or sets the hook in the mouth of a fish when the fish takes the bait, and also lifts the fish out of the water.

Another object of the present invention is to provide a fishing pole holder which is of simple construction, sturdily built and having an ingenious mechanism for setting the hook in a fish's mouth when the fish takes the bait.

A further object of the present invention is to provide an automatic fish retrieving device which is of light weight construction so as to be readily portable, one compact in size so as to require a minimum of storage space during transit, and one which is highly effective in action.

Figure 1:
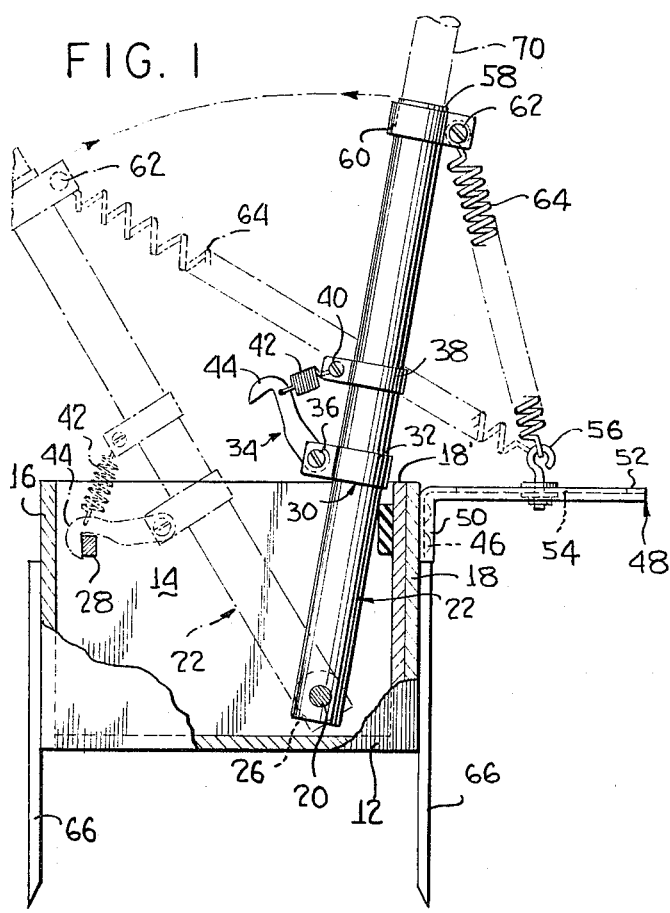
Figure 3:
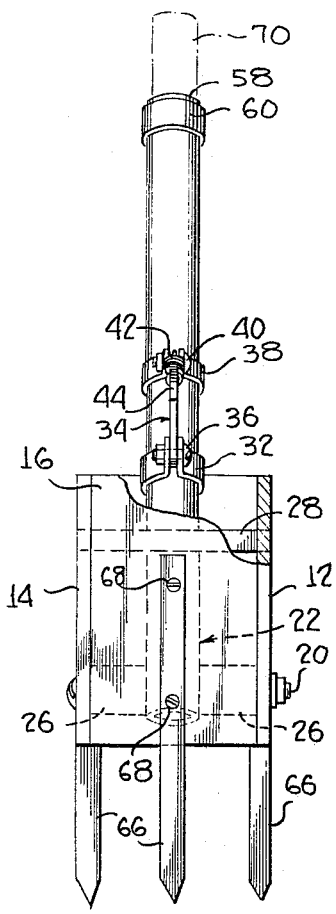
Figure 2:
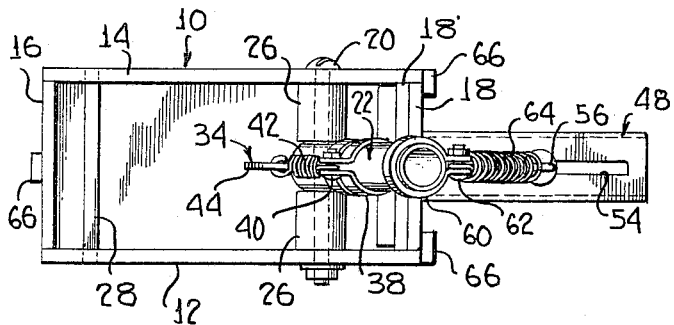

These and other objects of the present invention will be apparent from the description which follows and which is to be construed according to the teachings of the annexed drawing, in which:

FIGURE 1 is a side elevational view with a portion of one side wall broken away to show the interior structure,
FIGURE 2 is a top plan view, and
FIGURE 3 is an end elevational view.

Referring to the drawing in detail, the present invention consists in an open top box 10 having spaced apart side walls 12 and 14, a front end wall 16 and a rear end wall 18. The rear end wall 18 is fabricated of double thickness material as indicated at 18 and 18'.

Transversely arranged between and supported in the side walls 12 and 14 is a horizontally disposed shaft 20, disposed adjacent to and spaced from the box rear end wall 16.

An upright open ended tube 22 is provided adjacent to and inwardly of its lower end 24 with opposed openings which receives the midportion of the shaft 20. Spacers or washers 26, on each side of the tube 22, are secured to the shaft 20 and limit the movement of the tube 22 longitudinally of the shaft 20.

Spaced below and adjacent to the upper ends of the side walls 12 and 14 is a transversely arranged keeper bar 28 extending between and having its ends anchored in the side walls 12 and 14. The keeper bar 28 is spaced inwardly of and parallel to the front end wall 16.

At a point midlength of, or substantially midlength of the tube 22 is a ring clamp 22 having a pair of forwardly disposed spaced arms 32 formed therewith.

One end of a latch element 34 is pivotally connected by a pin 36 to the arms 32. Another ring clamp 38 is secured about the tube 22 at a point spaced above the ring clamp 30 and is provided with forwardly directed arms 40. A spring 42 extends from the arms 40 to a point on the latch element 34 inwardly of and spaced from the hook head 44 of the latch element 34.

Secured to the end wall 18, by a bolt and nut assembly 46, is an L-shaped bracket 48 disposed with the short leg 50 vertical and the long leg 52 horizontal and above the short leg 50. The long leg 52 is provided with a slot 54 and an eyebolt 56 is adjustably mounted in the slot 54.

The tube 22 carries, adjacent the upper end 58, a third ring clamp 60 having arms 62 and one end of a spring 64 is connected to the arms 62. The other end of the spring 64 is connected to the eyebolt 56. Adjustment of the position of the eyebolt 56 along the slot 54 varies the tension of the spring 64.

The rear end wall 18 carries two spikes or stakes 66, one at each end, and a single stake 66 projects downwardly from the front end wall 16. The stakes 66 are affixed to their respective end walls by conventional securing devices such as screws 68 as shown in FIGURE 3 with respect to the stake 66 on the end wall 16.

The use of the device of the present invention is as follows: First the box 10 is anchored to the ground with the stakes inserted into the ground. Next the tube 22 is swung forwardly and the latch element 34 is depressed so that the spring 42 is under tension and the hook-head is engaged on the keep bar 28.

Next, the bait is cast and the fish line played out or retrieved to the length desired, with the butt end of a fishing pole 70 ready to be inserted in the upper end of the tube 22.

After insertion of the rod or pole 70 in the tube 22 the line is retrieved still more so that the bait if taken by a fish pulls on the line with enough force so as to tilt the tube 22 forwardly a distance sufficient to permit the hook-head 44 to become disengaged from the keeper bar 28 so that the spring 42 retracts the latch element 34 and the spring 64 is permitted to retract the tube 22 from the forward dotted line position in FIGURE 1 to the full line position abutting the rear end wall 18. This action of the tube 22 effects the swinging movement of the fishing pole 70 and, according to the tension of the spring 64, with the sudden or abrupt jerk of the line to set the hook in the fish's mouth.

If desired the stakes 66 may be removed and the box 10 filled around the sides and forward end wall with weights such as stones or rocks which serve to stabilize the box 10 against inadvertent movement.

It will be seen therefore that the objects and advantages of the device are fully met by the structure, and while a single preferred form of the invention has been shown and described, it is intended that changes and modifications may be made therein as found practical, without departing from the spirit of the invention as set forth in the appended claims.

What is claimed is:

1. A fishing pole holder comprising a box having an open top, a transversely disposed shaft secured in opposed walls of said box inwardly of and spaced below the open top of said box, an upright tube disposed within said box and having the portion adjacent the lower end connected to said shaft for arcuate swinging movement of said tube perpendicularly of said shaft, said tube being adapted to receive through the open upper end thereof the butt end portion of a fishing rod for support of said rod in said tube, a keeper bar disposed above said shaft and in spaced relation with respect to said tube and supported by said box, a latch element carried by said tube and engageable with said keeper bar upon execution of swinging movement of said tube in one direction, spring means operable to effect swinging movement of said tube in the opposite direction and other spring means operable to release said latch element from said keeper bar upon execution of further movement of said tube in said one direction responsive to a pulling movement on the line of said fishing rod supported in said tube.

2. A fishing pole holder comprising a box having an open top and including opposed side walls, a transversely disposed shaft secured in said side walls of said box inwardly of and spaced below the open top of said box, an upright tube disposed within said box and having the portion adjacent the lower end connected to said shaft for arcuate swinging movement of said tube perpendicularly of said shaft, said tube being adapted to receive through the open upper end thereof the butt end portion of a fishing rod for support of said rod in said tube, a keeper bar disposed above said shaft and in spaced relation with respect to said tube and supported by said box, a latch element carried by said tube and engageable with said keeper bar upon execution of swinging movement of said tube in one direction, spring means operable to effect swinging movement of said tube in the opposite direction, and other spring means operable to release said latch element from said keeper bar upon execution of further movement of said tube in said one direction responsive to a pulling movement on the line of said fishing rod supported in said tube.

3. A fishing pole holder comprising a box having an open top and including opposed side walls, a front end wall, and a rear end wall, a transversely disposed shaft secured in said side walls of said box inwardly of and spaced below the open top of said box, an upright tube disposed within said box and having the portion adjacent the lower end connected to said shaft for arcuate swinging movement of said tube between said front and rear end walls, said tube being adapted to receive through the open upper end thereof the butt end portion of a fishing rod for support of said rod in said tube, a keeper bar disposed above said shaft and in spaced relation with respect to said tube and supported by said box, a latch element carried by said tube and engageable with said keeper bar upon execution of swinging movement of said tube toward said front end wall, spring means operable to effect swinging movement of said tube toward said rear end wall, and other spring means operable to release said latch element from said keeper bar upon execution of further movement of said tube toward said front end wall responsive to a pulling movement on the line of said fishing rod supported in said tube.

References Cited by the Examiner

UNITED STATES PATENTS

| | | | |
|---|---|---|---|
| 834,414 | 10/1906 | Schmidt | 43—16 |
| 1,856,477 | 5/1932 | Gerline | 43—15 |
| 2,551,996 | 5/1951 | Cherubini | 43—15 |
| 2,770,906 | 11/1956 | Hood | 43—16 |
| 2,784,517 | 3/1957 | Mooney | 43—16 |
| 2,843,962 | 7/1958 | Porter | 43—15 |

SAMUEL KOREN, *Primary Examiner.*

D. J. LEACH, *Assistant Examiner.*